(12) United States Patent
Shi

(10) Patent No.: US 11,517,914 B2
(45) Date of Patent: Dec. 6, 2022

(54) KITCHEN GARBAGE PROCESSOR

(71) Applicant: Liwei Shi, Guangdong (CN)

(72) Inventor: Liwei Shi, Guangdong (CN)

( * ) Notice: Subject to any disclaimer, the term of this patent is extended or adjusted under 35 U.S.C. 154(b) by 312 days.

(21) Appl. No.: 16/813,708

(22) Filed: Mar. 9, 2020

(65) Prior Publication Data
US 2021/0162425 A1 Jun. 3, 2021

(30) Foreign Application Priority Data

Nov. 29, 2019 (CN) .......................... 201911207191.8

(51) Int. Cl.
| | |
|---|---|
| *B02C 23/08* | (2006.01) |
| *B01D 17/02* | (2006.01) |
| *B01D 36/00* | (2006.01) |
| *E03C 1/266* | (2006.01) |
| *B02C 18/00* | (2006.01) |

(52) U.S. Cl.
CPC .............. *B02C 23/08* (2013.01); *B01D 17/02* (2013.01); *B01D 36/003* (2013.01); *B02C 18/0084* (2013.01); *B02C 18/0092* (2013.01); *E03C 1/2665* (2013.01); *B01D 2221/02* (2013.01); *B02C 2201/06* (2013.01)

(58) Field of Classification Search
CPC .. B03C 18/0092; B03C 18/0084; B02C 23/36
See application file for complete search history.

(56) References Cited

U.S. PATENT DOCUMENTS

| | | | |
|---|---|---|---|
| 8,091,811 B2* | 1/2012 | Yang ................. | B02C 18/2216 241/38 |
| 2003/0006327 A1* | 1/2003 | Ryu ..................... | B30B 9/127 241/236 |
| 2011/0079669 A1* | 4/2011 | Yang ................. | B02C 18/2216 241/68 |

FOREIGN PATENT DOCUMENTS

| | | | | |
|---|---|---|---|---|
| CN | 107899705 A | * | 4/2018 | ......... B02C 18/0092 |
| CN | 108284120 A | * | 7/2018 | ............. A23N 17/00 |
| CN | 110355186 A | * | 10/2019 | ......... B02C 18/0092 |
| KR | 2018017993 A | * | 2/2018 | ......... B02C 18/0084 |

* cited by examiner

*Primary Examiner* — Faye Francis

(57) ABSTRACT

A kitchen garbage processor, includes: a processor body, a dewatering component, and an oil-water separating component, the processor body has a working platform disposed thereon, an inlet for dumping kitchen garbage is disposed on the working platform, a fore end of the dewatering component is communicated with the inlet and configured to send a kitchen garbage that to be processed to the dewatering component to separate a solid garbage from a liquid garbage; a solid garbage outlet configured for sending out a processed solid garbage and a liquid garbage outlet configured for sending out a residual liquid garbage are disposed at a rear end of the dewatering component; a fore end of the oil-water separating component is communicated with the liquid garbage outlet so as to send liquid garbage that to be processed to the oil-water separating component to separate oil from water; an oil outlet configured for sending out separated oil and a water outlet configured for sending out separated water are disposed at a rear end of the oil-water separating component. Purpose of separating solid garbage, oil and water simultaneously is realized.

10 Claims, 8 Drawing Sheets

KITCHEN GARBAGE PROCESSOR

CROSS-REFERENCE TO RELATED APPLICATIONS

This application claims priority benefits to Chinese Patent Application No. 201911207191.8, filed Nov. 29, 2019, the contents of which are incorporated herein by reference.

TECHNICAL FIELD

The present application relates to a kitchen equipment, especially relates to a kitchen garbage processor.

BACKGROUND

Economy of modern society is developing rapidly, along with improvement of people's living standards and acceleration of urbanization, the quantity of urban household garbage is also increasing continuously, especially kitchen garbage. No matter for a single family, or commercial restaurants, it is necessary to improve the efficiency of kitchen garbage processor, and provide scientific means of disposal.

SUMMARY

A kitchen garbage processor includes: a processor body having a working platform disposed thereon, wherein an inlet for dumping kitchen garbage is disposed on the working platform, and at least one layer of filter screen is disposed at the inlet in order to filter out unprocessable part of the kitchen garbage;
a dewatering component disposed in the processor body, wherein a fore end of the dewatering component is communicated with the inlet and configured to send a kitchen garbage that to be processed to the dewatering component to separate a solid garbage from a liquid garbage; a solid garbage outlet configured for sending out a processed solid garbage and a liquid garbage outlet configured for sending out a residual liquid garbage are disposed at a rear end of the dewatering component; and
an oil-water separating component disposed in the processor body and located at downstream of the dewatering component, wherein a fore end of the oil-water separating component is communicated with the liquid garbage outlet so as to send liquid garbage that to be processed to the oil-water separating component to separate oil from water; an oil outlet configured for sending out separated oil and a water outlet configured for sending out separated water are disposed at a rear end of the oil-water separating component.

In one embodiment, the kitchen garbage processor further includes a first packaging component and a packaging bag feeding component, the first packaging component and the packaging bag feeding component are disposed in the processor body and located at downstream of the dewatering component; the first packaging component is disposed at the solid garbage outlet and configured to pickup a packaging bag from the packaging bag feeding component and send a solid garbage that sent out from the solid garbage outlet to the picked packaging bag.

In one embodiment, the first packaging component includes a first side sucker device, a second side sucker device and a rotating bracket; the first side sucker device is disposed opposite to the second side sucker device, whereby a space formed between the first side sucker device and the second side sucker device is configured to accommodate a packaging bag for holding solid garbage, such that the packaging bag is opened by suction force generated by the first side sucker device and the second side sucker device; the rotating bracket is connected to the first side sucker device so as to drive the first side sucker device to rotate at a position opposite to the second side sucker device and a position opposite to the packaging bag feeding component, and when the first side sucker device is at the position opposite to the packaging bag feeding component, the first side sucker device is configured to pick up packaging bag from the packaging bag feeding component.

In one embodiment, the first packaging component further includes a vacuum pump assembly, a sealing device and a push plate assembly; the vacuum pump assembly and the sealing device is disposed at a position of a bag mouth of the packaging bag, the vacuum pump assembly is configured to vacuum the packaging bag after the packaging bag is filled with the solid garbage, and the sealing device is configured to seal the packaging bag after the packaging bag is filled with the solid garbage; the push plate assembly is configured to push the packaging bag out of the processor body after the packaging bag is sealed.

In one embodiment, a sliding door assembly is disposed on a side of the processor body that bagged kitchen garbage is taken out therefrom, a door of the sliding door assembly is opened when the push plate assembly push the packaging bag that filed with kitchen garbage out of the processor body, and the door of the sliding door assembly is automatically closed when the packaging bag is taken away.

In one embodiment, the kitchen garbage processor further includes a second packaging component and a packaging bag feeding component, the second packaging component and the packaging bag feeding component are disposed in the processor body and located at downstream of the oil-water separating component; the second packaging component is disposed at the oil outlet and configured to pickup a packaging bag from the packaging bag feeding component and send oil that sent out from the oil outlet to the picked packaging bag.

In one embodiment, the second packaging component includes a first side sucker device, a side sucker device a rotating bracket, a rotating bracket, a vacuum pump assembly, a sealing device and a push plate assembly; the first side sucker device is disposed opposite to the second side sucker device, whereby a space formed between the first side sucker device and the second side sucker device is configured to accommodate a packaging bag for holding solid garbage, such that the packaging bag is opened by suction force generated by the first side sucker device and the second side sucker device; the rotating bracket is connected to the first side sucker device so as to drive the first side sucker device to rotate at a position opposite to the second side sucker device and a position opposite to the packaging bag feeding component, and when the first side sucker device is at the position opposite to the packaging bag feeding component, the first side sucker device is configured to pick up packaging bag from the packaging bag feeding component; the vacuum pump assembly and the scaling device is disposed at a position of a bag mouth of the packaging bag, the vacuum pump assembly is configured to vacuum the packaging bag after the packaging bag is filled with the solid garbage, and the sealing device is configured to seal the packaging bag after the packaging bag is filled with the solid garbage; the push plate assembly is configured to push the packaging bag out of the processor body after the packaging bag is sealed; a sliding door assembly is disposed on a side of the processor body that bagged kitchen garbage is taken out therefrom, a door of the sliding door assembly is opened when the push plate assembly push the packaging bag that filed with kitchen garbage out of the processor body, and the door of the sliding door assembly is automatically closed when the packaging bag is taken away.

In one embodiment, the dewatering component includes a helical transmission element, a helical cylinder and cylindrical filter screen, the helical cylinder is disposed on the helical transmission element, the cylindrical filter screen is disposed on the helical cylinder, wherein the kitchen garbage is dumped into the helical cylinder through the inlet of the processor body, and along with rotating of the helical transmission element, the solid garbage is sent to the solid garbage outlet and the liquid garbage is sent to the liquid garbage outlet through the cylindrical filter screen.

In one embodiment, the oil-water separating component include an oil-water mixing chamber, an oil-water separating chamber and an oil storage chamber; an inlet of the oil-water mixing chamber is communicated with the liquid garbage outlet of the dewatering component, the oil-water mixing chamber is communicated with the oil-water separating chamber, and a filter screen is disposed between the oil-water mixing chamber and the oil-water separating chamber; the oil storage chamber is communicated with an upper portion of the oil-water separating chamber so as to send the separated oil to the storage chamber, the water outlet is communicated with an bottom portion of the oil-water separating chamber so as to send out the separated water; the oil storage chamber is communicated with the oil outlet so as to send out the separated oil.

In one embodiment, the kitchen garbage processor further includes: a hot water spraying cleaner and/or a deodorizing and disinfecting device, the spraying cleaner comprises a electrical water heater, a water pump, a water supplying assembly and a spraying pipe; the water supplying assembly is communicated with a water supplying inlet, and an outlet is communicated with a water outlet of the electrical water heater; the water outlet of the electrical water heater is communicated with a water inlet of the water pump, a water outlet of the water pump is communicated with the spraying pipe so as to transfer hot water to a spraying mouth; or a hot water spraying cleaner and a deodorizing and disinfecting device, the spraying cleaner comprises a electrical water heater, a water pump, a water supplying assembly and a spraying pipe; the water supplying assembly is communicated with a water supplying inlet, and an outlet is communicated with a water outlet of the electrical water heater; the water outlet of the electrical water heater is communicated with a water inlet of the water pump, a water outlet of the water pump is communicated with the spraying pipe so as to transfer hot water to a spraying mouth; and the deodorizing and disinfecting device is communicated with the spraying pipe of the hot water spraying cleaner so as to inject a deodorizing and disinfecting liquid stored in the deodorizing and disinfecting device into the spraying pipe.

According to the kitchen garbage processor of embodiments of the present disclosure, solid garbage, oil and water could be separated simultaneously

BRIEF DESCRIPTION OF THE DRAWINGS

In order to explain the technical solution of embodiments of the present disclosure more clearly, hereinafter the drawings necessary for the description of embodiments will be described briefly. Obviously, these drawings described below are some examples of the present disclosure, based on which, one with ordinary skills in the art, without any creative labor, can also derive other drawings.

DETAILED DESCRIPTION

Figure 1:
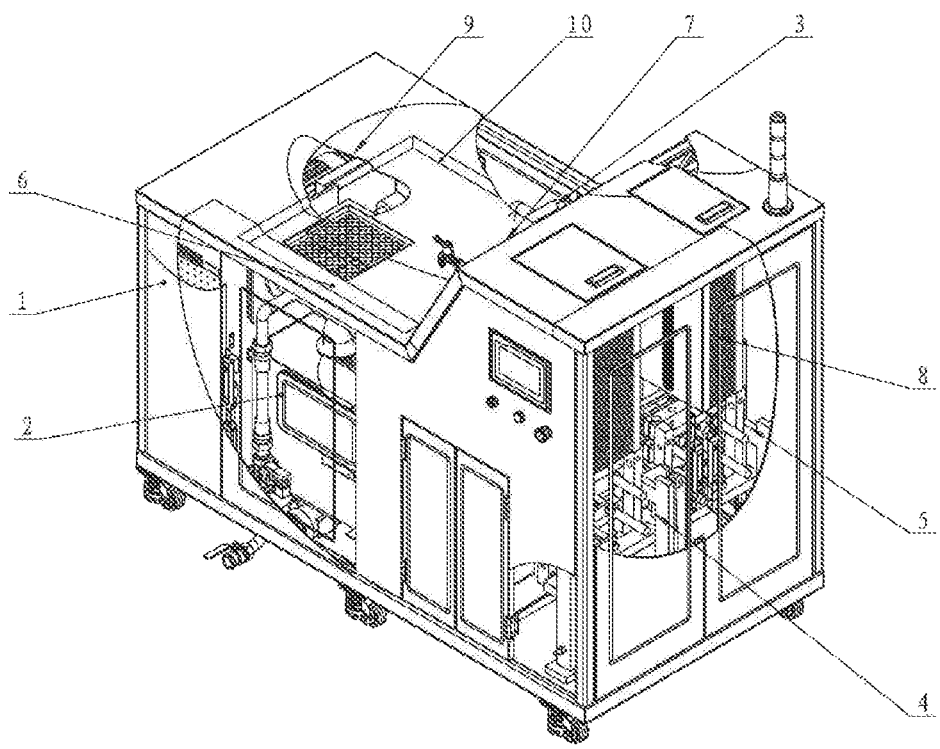
FIG. 1 is a schematic structural view of a kitchen garbage processor.

Hereafter the technical solution of embodiments of the present disclosure will be described clearly and completely in accompanying drawings of embodiments of the present disclosure, obviously, these embodiments described are only part, but not all of the embodiments of the present disclosure. All other embodiments that can be made by one with ordinary skills in the art without any creative labor based on these embodiments of the present disclosure shall fall within the protection scope of the present disclosure.

Similar elements described in different embodiments adopt correlative similar reference numbers. In embodiments described below, many details are described only for better understanding the present disclosure. However, one with ordinary skills in the art would effortlessly recognize that some technical features of the present disclosure could be omitted under different circumstances, or replaced by other elements, materials or methods. Under some circumstances, some relevant operations of the present disclosure are not shown or described in the specification in order to prevent key part of the present disclosure from being submerged by too many descriptions, in addition, for those with ordinary skill in the art, it is not necessary to describe these relevant operations in detail, they could fully understand these relevant operations according to the description in the specification and general technical knowledge in the art.

In addition, characteristics, operations or technical features described in the specification could be arranged together in any appropriate manner so as to form various embodiments. At the mean time, sequence of each step or action described in the method could also be exchanged or adjusted in a way that obvious to those skilled in the art. Therefore, various sequences in the specification and drawings are described for clearly describing a particular embodiment only, which does not imply that it is the necessary sequence, unless otherwise clearly specified.

The wording itself, such as "first" and "second", labeled for elements of the present disclosure are only used for the purpose of distinguishing, and do not contain any sequential or technical meaning. While, unless otherwise clearly specified and defined, terms such as "connected", "joint", should represent directly connection, and indirectly connection (joint). In addition, term "comprise" and their variants have non-exclusive meaning. For example, a process, a method, a system, a product or a comprising a series of steps or units should not be constructed to be limited to these steps or units that already listed, and should be constructed to optionally include other steps or units that are not listed, or should be constructed to optionally further include other steps or units that are inherent in these process, method, system, product or.

Embodiments of the present disclosure provide a kitchen garbage processor, which includes:

a processor body having a working platform disposed thereon, wherein an inlet for dumping kitchen garbage is disposed on the working platform, and at least one layer of filter screen is disposed at the inlet in order to filter out unprocessable part of the kitchen garbage;

a dewatering component disposed in the processor body, wherein a fore end of the dewatering component is communicated with the inlet and configured to send a kitchen garbage that to be processed to the dewatering component to separate a solid garbage from a liquid garbage; a solid garbage outlet configured for sending out a processed solid garbage and a liquid garbage outlet configured for sending out a residual liquid garbage are disposed at a rear end of the dewatering component; and an oil-water separating component disposed in the processor body and located at downstream of the dewatering component, wherein a fore end of the oil-water separating component is communicated with the liquid garbage outlet so as to send liquid garbage that to be processed to the oil-water separating component to separate oil from water; an oil outlet configured for sending out separated oil and a water outlet configured for sending out separated water are disposed at a rear end of the oil-water separating component.

Please refer to FIGS. 1-9, in some specific embodiments, the kitchen garbage processor includes a processor body 1, an oil-water separating component 2, a hot water spraying cleaner 3, a first packaging component 4, a second first packaging component 5, a dewatering, component 6 (for example, a helical extrusion dewatering component), a liquid filling component 7, a packaging bag feeding component 8, a vacuum pump assembly 9, and deodorizing and disinfecting device 10. The processor body 1 is made of stainless steel or aluminum alloy, components, such as side plate and door, are disposed on out surface of the processor body 1, a wheel is mounted on bottom of the processor body, a distribution box is disposed on a lower portion of fore side within the processor body, and the vacuum pump assembly 9 is disposed on an upper portion of the fore side within the processor body 1, the oil-water separating component 2 is disposed on a lower side within the processor body 1, the helical extrusion dewatering component 6 is disposed on an upper portion within the processor body 1, the hot water spraying cleaner 3, the deodorizing and disinfecting device 10 and the liquid filling component 7 are disposed on a left side of the processor body 1. The first packaging component 4 that alignment with the helical extrusion dewatering component 6 is disposed on rear side of the processor 1, the second first packaging component 5 that alignment with the liquid filling component 7 is disposed on rear side of the processor 1, the packaging bag feeding component 8 is disposed on upper portion of the rear side of the processor 1, a display and controlling elements are disposed on a left side plate and a right side plate disposed on the rear side of the processor 1.

The working principle of the kitchen garbage processor may be: the kitchen garbage is dumped in the kitchen garbage processor above the helical extrusion dewatering component 6, a filter screen having a larger aperture is disposed on an upper inlet in order to avoid entering of steel objects, such as tableware. Within the helical extrusion dewatering component 6, along with rotating and extrusion of the helical transmission element 601, the liquid material (oil and water) is separated from the kitchen garbage, and solid garbage is pushed into a filling chamber, and then a plastic bag is fed to the first packaging component 4 through the packaging bag feeding component 8 to perform kitchen garbage filling and sealing. Further, the water and oil separated through the helical extrusion dewatering component 6 is sent to the oil-water separating component 2 by a lower pipe of the helical extrusion dewatering component 6 and the filter screen, and the water and oil are separated by the oil-water separating component 2, the oil floats above the water within the oil-water separating component 2, the oil enters into the oil storage chamber 216 and is filed through the liquid filling component 7, and a plastic bag is fed to the second packaging component 5 through the packaging bag feeding component 8 to perform waste oil filling and sealing. Further, the water separated by the oil-water separating component 2 will be discharged when standard requirements are met; the residue within the oil-water separating component 2 would be sent back to the helical extrusion dewatering component 6 via the return pipe component 209 to perform secondary processing.

Through helical transmission element 601, the solid garbage could be compressed and squeezed at the same time that the solid garbage is sent to the solid garbage outlet, such that the solid garbage and the liquid garbage could be separated better. Certainly, in other embodiments, the solid garbage and the liquid garbage could be separated by means other than squeezing, such as static separation or other squeezing apparatus other than helical transmission element.

Figure 2:
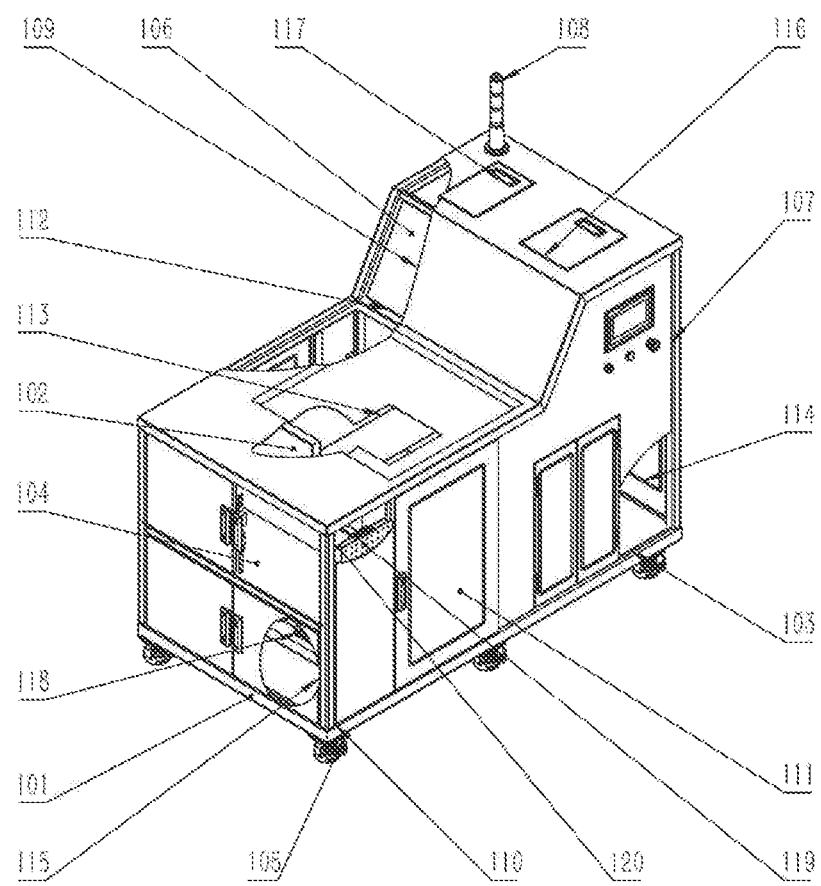
FIG. 2 is a schematic structural view of a processor body of a kitchen garbage processor according to one embodiment of the present disclosure.
Figure 3:
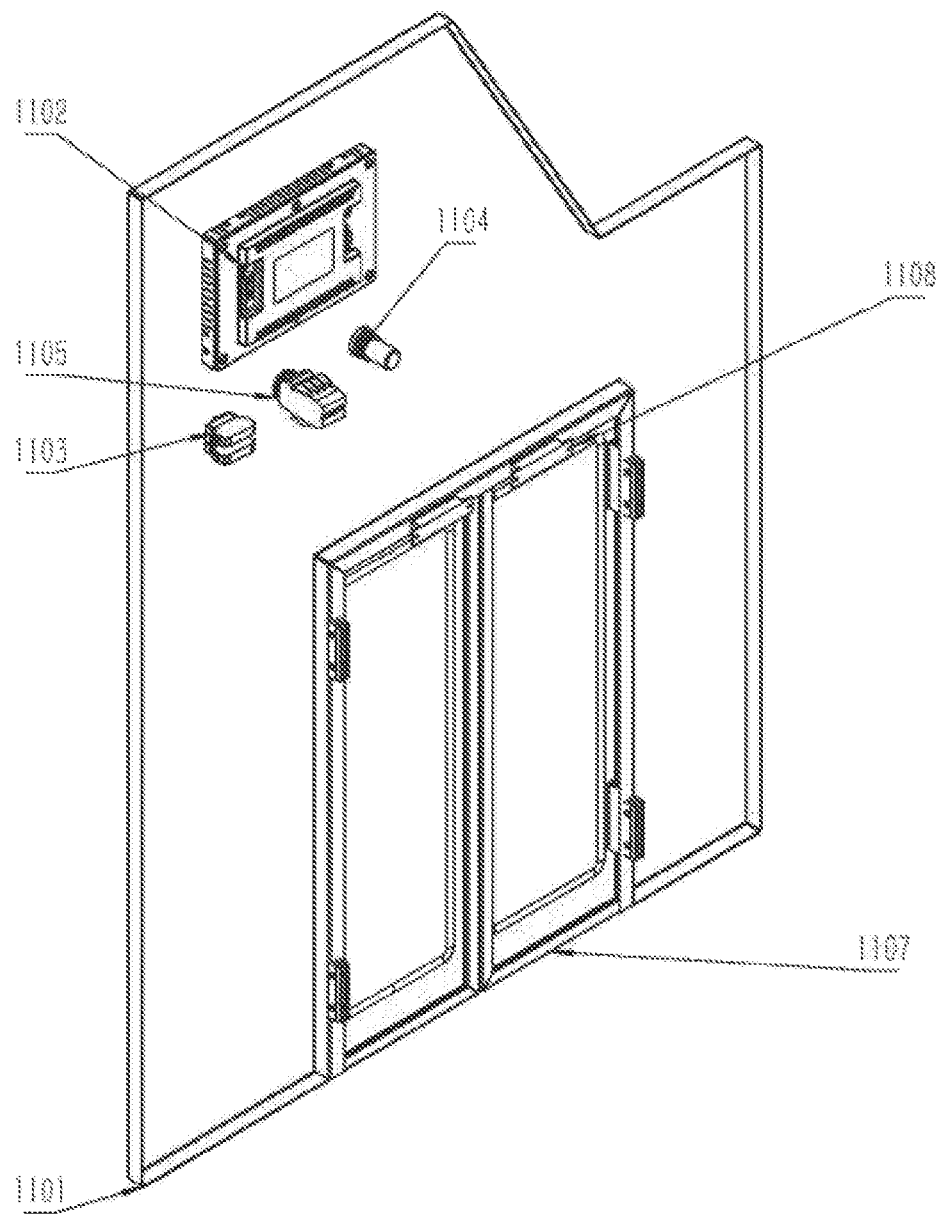
FIG. 3 is a schematic structural view of a sliding door of a kitchen garbage processor according to one embodiment of the present disclosure.

As shown in FIG. 2, the processor body 1 includes a frame 101, a middle plate 102, a bottom plate 103, an installation plate of vacuum pump 104, a wheel 105, a first side plate mounting component 106, a second side plate mounting component 107, a tricolor alarm lamp 108, a faceplate 109, a side plate 110, a door component 111, a front plate, a spraying system support plate 113, a rear door component 114, a distribution box door component 115, a first bag feeding component door 116, a second bag feeding component door 117, a circuit board 118; six wheels 105 are mounted on bottom of the frame 101 the tricolor alarm lamp 108 is disposed on the faceplate 109 mounted on the frame 101, the first side plate mounting component 106 and the second side plate mounting component 107 are disposed on rear portion of the faceplate 109; two door components 5 are symmetrically mounted on upper front portion of the frame 101, and two door components 115 are symmetrically mounted on lower front portion of the frame 101; a spare filter screen 119 and an upper filter screen cap 120 are placed on an internal chamber wall of the vacuum pump 104, two transparent door components 111 are symmetrically mounted on left and right sides of a middle portion of the processor body 1; two transparent first bag feeding component door 116 and second bag feeding component door 117 are symmetrically mounted on left and right sides of a rear portion of the processor body 1, a sliding door assembly (as shown in FIG. 3) is disposed on the first side plate mounting component 106 and the second side plate mounting component 107 respectively; two transparent rear door components 114 are symmetrically mounted on left and right sides of a very rear portion of the processor body 1; the spraying system support plate 113 is mounted on upper middle of the processor body 1.

As shown in FIG. 3, the second side plate mounting component 107 includes a side plate 1101 (110), a touch screen 1102, an emergency stop switch 1103, a flash buzzer 1104, a self-locking button with lamp 1105, a self-closing door component 1107, and a magnetic buckle 1108, the touch screen 110, the emergency stop switch 1103, the flash buzzer 1104 and the button 1105 are mounted on upper portion of the side plate 1101 so as to control the overall operation; a transparent self-closing door component 1107 is mounted on an inner wall of a middle lower portion of the side plate 1101, the magnetic buckle 1108 is mounted on an upper portion of the side plate 1101 so as to magnetic absorb the self-closing door component 1107; two self-closing spring hinges are mounted on the self-closing door component 1107, the self-closing door component 1107 is open under promotion by external force, and the self-closing door component 1107 is automatically closed under action of the two self-closing spring hinges when there is no external force. The sliding door of the first side plate mounting component 106 have a same structure as the self-closing door component 1107, thus description thereof is omitted herein.

In one embodiment, the oil-water separating component includes an oil-water mixing chamber, an oil-water separating chamber and an oil storage chamber; an inlet of the oil-water mixing chamber is communicated with the liquid garbage outlet of the dewatering component, the oil-water mixing chamber is communicated with the oil-water separating chamber, and a filter screen is disposed between the oil-water mixing chamber and the oil-water separating chamber; the oil storage chamber is communicated with an upper portion of the oil-water separating chamber so as to send the separated oil to the storage chamber, the water outlet is communicated with an bottom portion of the oil-water separating chamber so as to send out the separated water; the oil storage chamber is communicated with the oil outlet so as to send out the separated oil.

Figure 4:
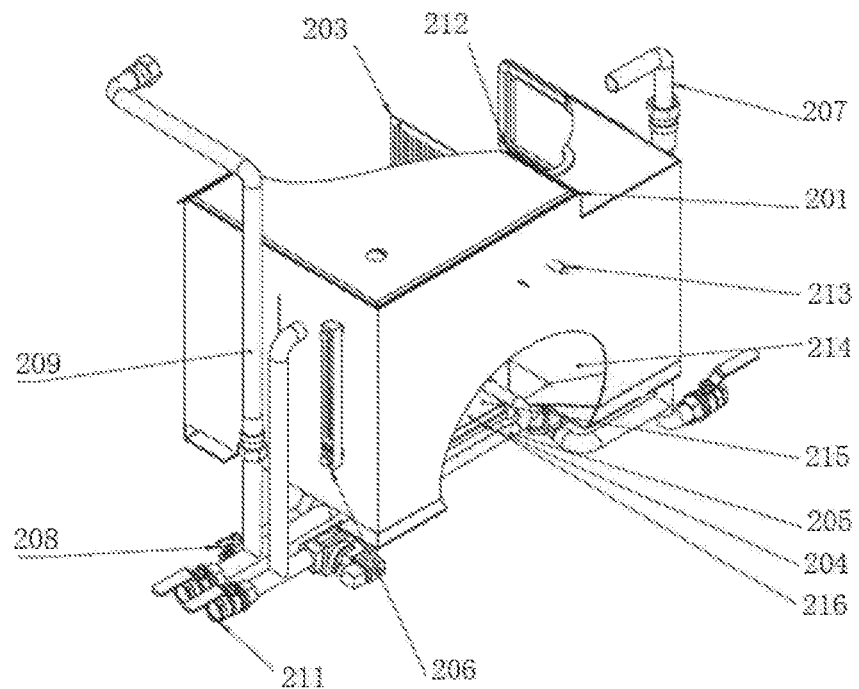
FIG. 4 is a schematic structural view of an oil-water separating component of a kitchen garbage processor according to one embodiment of the present disclosure.

As shown in FIG. 4, which is a schematic structural view of an oil-water separating component 2 of one embodiment, a separating plate and a filter screen 203 are mounted between the oil-water mixing chamber 214 and the oil-water separating chamber 215 in a tank 201 of the oil-water separating component, further, an oil storage chamber 216 is mounted on an upper portion of the oil-water separating chamber 215, an inlet of the oil storage chamber 216 is lower than a lowest point of the filter screen 203, an water outlet connected to a sewage discharge pipe component 211 is mounted on a left side of the oil-water separating chamber 215, the water outlet of the oil-water separating chamber 215 is lower than a lowest point of the inlet of the oil storage chamber 216. An outlet connected to the sewage discharge pipe component 211 is also disposed on a very bottom portion of the oil-water separating chamber 215, and an electromagnetic valve is disposed between the outlet and the sewage discharge pipe component 211 so as to control opening and closing of sewage discharging of the oil-water separating chamber 215; an outlet connected to a return pipe component 207 is also disposed on a very bottom portion of the oil-water mixing chamber 214, and a water pump is disposed between the outlet and the return pipe component 207 so as to transport a residue and sewage in the oil-water mixing chamber 214 to return to the helical extrusion dewatering component 6 to perform secondary processing, a branch pipe and a valve are disposed on the return pipe component 207 to discharge residue and sewage, a quick plug soft pipe is connected at middle of the return pipe component 207 to disassemble the return pipe component 207; a dirt oil discharge port is disposed on bottommost of the oil storage chamber 216 and communicated with the liquid filling component 7 via a dirt oil discharge component 209, separated oil that need to be canned are stored in the oil storage chamber 216, and a quick plug soft pipe is connected between the oil storage chamber 216 and the liquid filling component 7, so as to disassemble dirt oil discharge component 209. A branch pipe and a valve are disposed on the dirt oil discharge component 209 to discharge dirt oil; a fluid level indicator 206 is mounted on a side wall of the sewage discharge pipe component 211 of the tank 201 of the oil-water separating component, a heating sheet 204 is disposed on bottom of the tank 201 of the oil-water separating component; a bubble blowing system 205 is mounted on an internal lower portion of the tank 201 of the oil-water separating component, and a valve is disposed at entry of the of the bubble blowing system 205. The bubble blowing system 205 is configured to blow bubble of the oil and water so as to accelerate the separation of oil and water; a oil-water separation nozzle assembly 213 configured to clean and spraying is disposed between the oil-water mixing chamber 214 and the oil-water separating chamber 215, such that elements, such as, filter screen 203 may be cleaned; further, a transparent oil-water separation sealing door assembly 212 is mounted on the tank 201 of the oil-water separating component disposed outside the oil-water mixing chamber 214 to observe, disassemble and clean the filter screen 203.

In the present embodiment, oil and water are separated by means of static separation, while in other embodiment, some other structures designed for static separation may also be adopted, the present embodiment provide only one specific feasible structure, which should not be constructed as a limitation to structure of the oil-water separating component in the present disclosure.

In one embodiment, the kitchen garbage processor further includes a hot water spraying cleaner, the spraying cleaner includes an electrical water heater, a water pump, a water supplying assembly and a spraying pipe; the water supplying assembly is communicated with a water supplying inlet, and an outlet is communicated with a water outlet of the electrical water heater; the water outlet of the electrical water heater is communicated with a water inlet of the water pump, a water outlet of the water pump is communicated with the spraying pipe so as to transfer hot water to a spraying mouth. A location of the spraying mouth may be designed depending on position that needs to be cleaned, for example, the spraying mouth could be disposed on the working platform, in the dewatering component, or in the oil-water separating component, etc.

Figure 5:
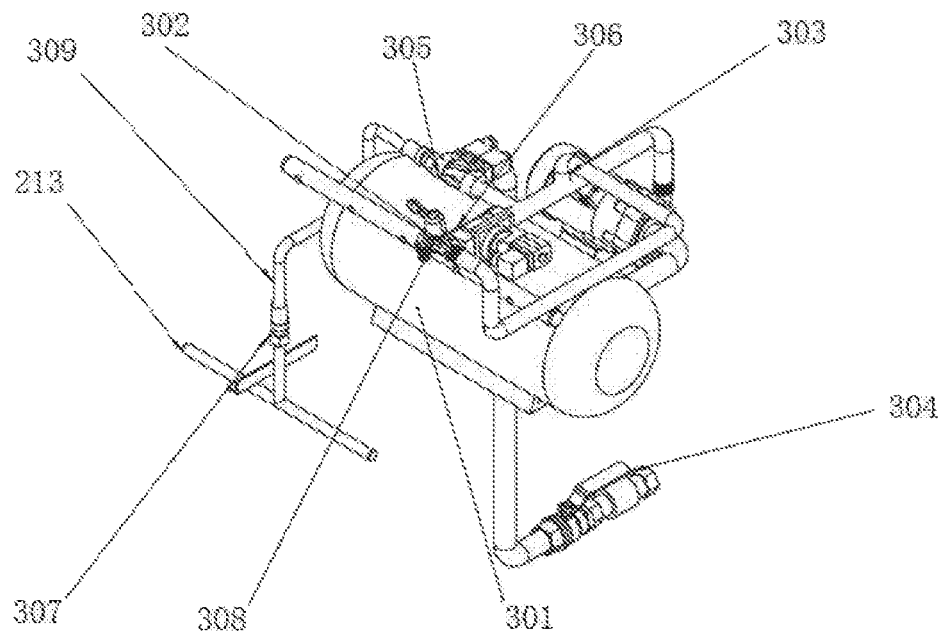
FIG. 5 is a schematic structural view of a hot water spraying cleaner of a kitchen garbage processor according to one embodiment of the present disclosure.

Please refer to FIG. 5, which shows a schematic structural view of a hot water spraying cleaner 3 according to one embodiment of the present disclosure, an electrical heating element and controlling component are disposed in an electrical water heater 301, the electrical water heater 301 is connected to the water supplying assembly 304 so as to supply water, the water outlet of the electrical water heater 301 is communicated with the water inlet of the water pump 303, and the water outlet of the water pump 303 is communicated with the spraying pipe 302, and a pressure control valve is disposed therebetween; the spraying pipe 302 has three branches, a first branch is connected to a nozzle of the helical extrusion dewatering component 6, a second branch is connected to the oil-water separation nozzle assembly 213, and a third branch is connected to a water faucet 308 of a cleaning table; the first branch connected to the nozzle of the helical extrusion dewatering component 6 is controlled by an electromagnetic valve 306, the second branch connected to the oil-water separation nozzle assembly 213 is controlled by an electromagnetic valve 305, and second branch connected to the oil-water separation nozzle assembly 213 may be connected via a quick plug soft pipe 307 so as to disassemble oil-water separation nozzle pipe 309.

In some other embodiments, the spraying cleaner includes no electrical water heater, and the spraying cleaner is directly connected to an external hot water supply system through the water supplying assembly, or the spraying cleaner perform its cleaning function through spraying cold water directly.

In one embodiment, the kitchen garbage processor further includes a deodorizing and disinfecting device. The deodorizing and disinfecting device is communicated with the spraying pipe of the hot water spraying cleaner so as to inject a deodorizing and disinfecting liquid stored in the deodorizing and disinfecting device into the spraying pipe, so as to disinfect the pipe to ensure internal hygiene. Specifically, the deodorizing and disinfecting device injects deodorizing and disinfecting liquid into the spraying pipe regularly.

In one embodiment, the kitchen garbage processor further includes a first packaging component and a packaging bag feeding component, the first packaging component and the packaging bag feeding component are disposed in the processor body and located at downstream of the dewatering component; the first packaging component is disposed at the solid garbage outlet and configured to pickup a packaging bag from the packaging bag feeding component and send a solid garbage that sent out from the solid garbage outlet to the picked packaging bag.

In one embodiment, the first packaging component includes a first side sucker device, a second side sucker device and a rotating bracket; the first side sucker device is disposed opposite to the second side sucker device, whereby a space formed between the first side sucker device and the second side sucker device is configured to accommodate a packaging bag for holding solid garbage, such that the packaging bag is opened by suction force generated by the first side sucker device and the second side sucker device; the rotating bracket is connected to the first side sucker device so as to drive the first side sucker device to rotate at a position opposite to the second side sucker device and a position opposite to the packaging bag feeding component, and when the first side sucker device is at the position opposite to the packaging bag feeding component, the first side sucker device is configured to pick up a packaging bag from the packaging bag feeding component.

In one embodiment, the first packaging component further includes a vacuum pump assembly, a sealing device and a push plate assembly; the vacuum pump assembly and the sealing device are disposed at a position of a bag mouth of the packaging bag, the vacuum pump assembly is configured to vacuum the packaging bag after the packaging bag is filled with the solid garbage, and the sealing device is configured to seal the packaging bag after the packaging bag is filled with the solid garbage; the push plate assembly is configured to push the packaging bag out of the processor body after the packaging bag is sealed.

In one embodiment, a sliding door assembly is disposed on a side of the processor body that bagged kitchen garbage is taken out therefrom, a door of the sliding door assembly is opened when the push plate assembly push the packaging bag that filed with kitchen garbage out of the processor body, and the door of the sliding door assembly is automatically closed when the packaging bag is taken away.

Figure 6:
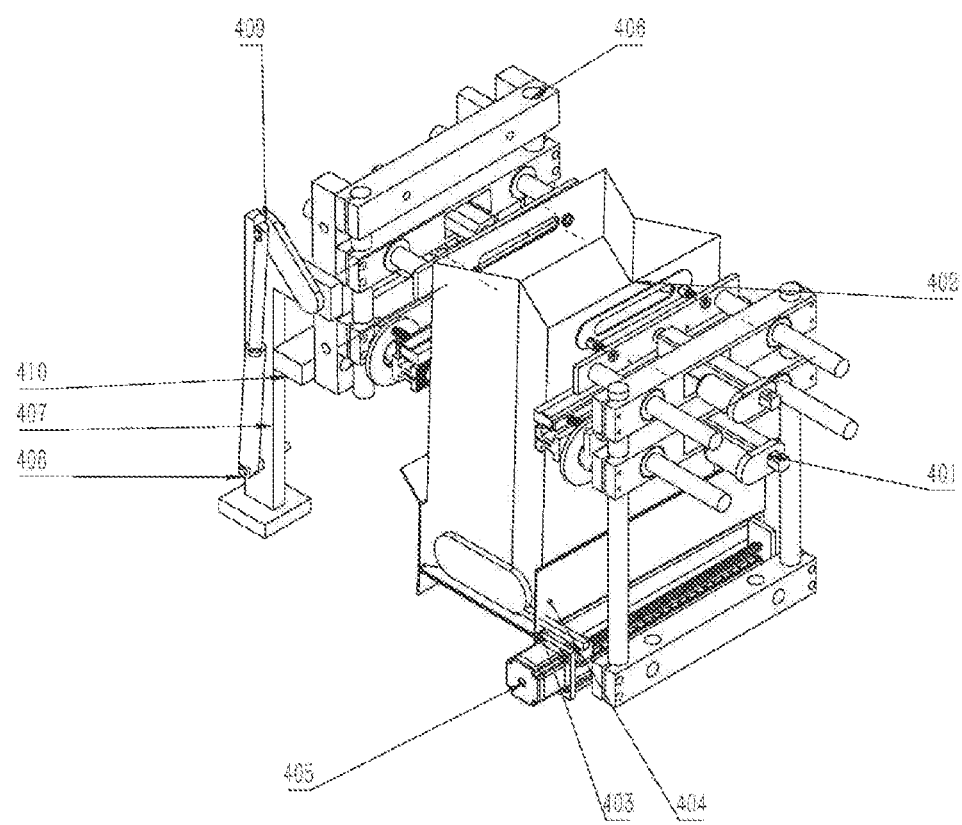
FIG. 6 is a schematic structural view of a garbage packaging component of a kitchen garbage processor according to one embodiment of the present disclosure.

Please refer to FIG. 6, which is a schematic structural view of a first packaging component, the first packaging component includes a sealing device 401, a plastic bag for, kitchen waste 402, a supporting plate base 403, a supporting plate 404, a push plate assembly 405, a sealing device bracket-mobile platform 406, a rotating bracket 407, a push-pull straight line push rod cylinder 408, a push-pull straight line push rod 409, and a base plate 410. The sealing device 401 and the sealing device bracket-mobile platform 406 are mounted on the processor body 1, the supporting plate base 403 is disposed between the sealing device 401 and the sealing device bracket-mobile platform 406, the supporting plate 404 is mounted on the supporting plate base 403, a push plate is disposed on the push plate assembly 405 to push a filled and sealed packaging bag out of the supporting plate 404. The rotatable rotating bracket 407 is disposed on the e sealing device bracket mobile platform 406, the rotating bracket 407 is rotated 90 degrees through the push-pull straight line push rod cylinder 408 and the push-pull straight line push rod 409, the rotating bracket 407 is at a position counterpart to a plastic bag in the packaging bag feeding component 8 when a sucker of the rotating bracket 407 faces upwardly, the sucker is pushed upwardly so as to suck the plastic bag, then the rotating bracket 407 is rotated 90 degrees to face to the scaling device 401, a sucker of the scaling device 401 and the sucker of the rotating bracket 407 open the plastic bag, and a filling gate valve conveying component 615 (shown in FIG. 8) of the helical extrusion dewatering component 6 inserts a filling pipe into the plastic bag downwardly, the sucker of the sealing device 401 and two clamping elements of the rotating bracket 407 are folded together so as to clamp the plastic bag to prevent the plastic bag from falling of, after filling, the sucker of the sealing device 401 and two cotton cushions of the rotating bracket 407 clamp together, and the plastic bag is vacuumed by the vacuum pump, and lastly the filled plastic bag is heat sealed by the sucker of the sealing device 401 and two heat sealing pliers of the rotating bracket 407.

In one embodiment, the kitchen garbage processor further includes a second packaging component and a packaging bag feeding component, the second packaging component and the packaging bag feeding component are disposed in the processor body and located at downstream of the oil-water separating component; the second packaging component is disposed at the oil outlet and configured to pickup a packaging bag from the packaging bag feeding component and send oil that sent out from the oil outlet to the picked packaging bag.

In one embodiment, the second packaging component includes a first side sucker device, a second side sucker device, a rotating bracket, a vacuum pump assembly, a sealing device and a push plate assembly; the first side sucker device is disposed opposite to the second side sucker device, whereby a space formed between the first side sucker device and the second side sucker device is configured to accommodate a packaging bag for holding solid garbage, such that the packaging bag is opened by suction force generated by the first side sucker device and the second side sucker device; the rotating bracket is connected to the first side sucker device so as to drive the first side sticker device to rotate at a position opposite to the second side sucker device and a position opposite to the packaging bag feeding component, and when the first side sucker device is at the position opposite to the packaging bag feeding component, the first side sucker device is configured to pick up packaging bag from the packaging bag feeding component; the vacuum pump assembly and the sealing device is disposed at a position of a bag mouth of the packaging bag, the vacuum pump assembly is configured to vacuum the packaging bag after the packaging bag is filled with the solid garbage, and the sealing device is configured to seal the packaging bag after the packaging bag is filled with the solid garbage, specifically, the sealing device may seal the packaging bag in a hot sealing manner. The push plate assembly is configured to push the packaging bag out of the processor body after the packaging bag is sealed; a sliding door assembly is disposed on a side of the processor body that bagged kitchen garbage is taken out therefrom a door of the sliding door assembly is opened when the push plate assembly push the packaging bag that filed with kitchen garbage out of the processor body, and the door of the sliding door assembly is automatically closed when the packaging bag is taken away. Structure and working principle of the sliding door assembly may be referred to FIG. 3 as well as the above description made to FIG. 3.

It should be noted that, the second packaging component 5 and the first packaging component 4 have a same structure, the filling component adopts a liquid filling component 7, difference between the second packaging component 5 and the first packaging component 4 is that the first packaging component 4 is configured to package kitchen solid garbage, and the second packaging component 5 is configured to package liquid oil.

Figure 8:
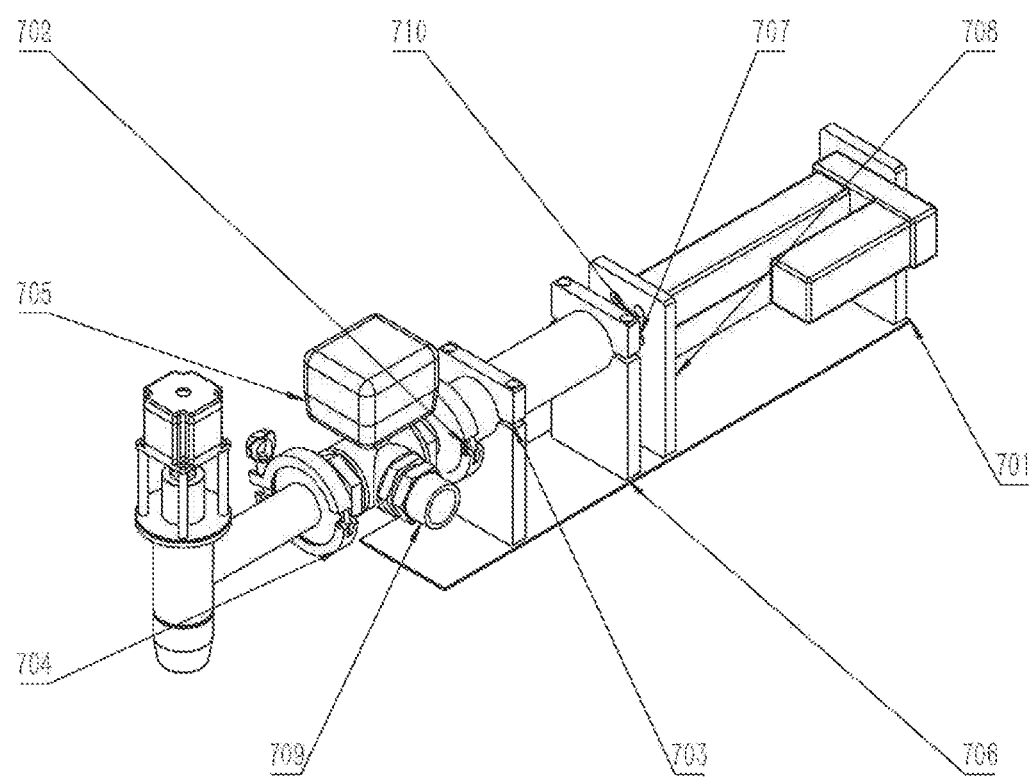
FIG. 8 is a schematic structural view of a liquid filling component of a kitchen garbage processor according to one embodiment of the present disclosure.

Please refer to FIG. 8, which shows a schematic structural view of a liquid filling component 7, the liquid filling component 7 includes a liquid filling component mounting plate 701, a plunger pump 702, a plunger base 703, a filling tool 704, a three-way valve 705, a first plunger pump base 706, a second plunger pump base 707, an electric cylinder mounting base 708, a reducer (different-diameter pipe) 709, an electric cylinder 710, two plunger bases 703 are mounted on the liquid filling component mounting plate 701, the plunger pump 702 is mounted on the plunger base 703, the plunger pump 702 is powered by the electric cylinder 710, one end of the plunger pump 702 is connected to the filling tool 704 via the three-way valve 705, the reducer 709 is mounted at an end port of the filling tool 704, the reducer 709 is connected to an outlet of the oil storage chamber 216 of the oil-water separating component 2, the electric cylinder 710 is supported by the electric cylinder mounting base 708. When the plunger pump 702 are controlled by the three-way valve 705 to communicate with the outlet of the oil storage chamber 216, dirty oil is sucked into the plunger pump 702, and when the plunger pump 702 are controlled to communicate with the filling tool 704, if the filling tool 704 is open, filling of oil that needed to be separated will be performed.

In one embodiment, the dewatering component includes a helical transmission element, a helical cylinder and cylindrical filter screen, the helical cylinder is disposed on the helical transmission element, the cylindrical filter screen is disposed on the helical cylinder, the kitchen garbage is dumped into the helical cylinder through the inlet of the processor body, and along with rotating of the helical transmission element, the solid garbage is sent to the solid garbage outlet and the liquid garbage is sent to the liquid garbage outlet through the cylindrical filter screen.

Figure 7:
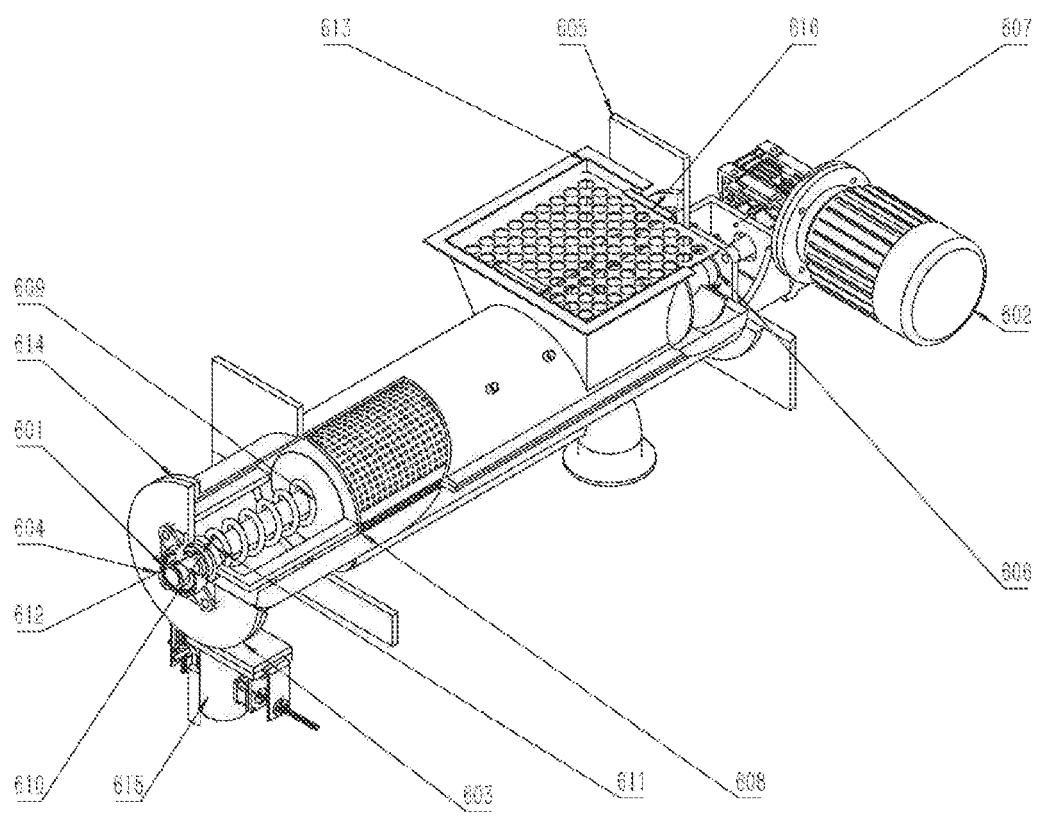
FIG. 7 is a schematic structural view of a helical extrusion dewatering component of a kitchen garbage processor according to one embodiment of the present disclosure.

Please refer to FIG. 7, which shows a schematic structural view of a helical extrusion dewatering component 6, the helical extrusion dewatering component 6 includes a helical transmission element 601, a motor reducer 602, a helical cylinder lower portion 603, a bearing seat 604, a helical extrusion fore plate 605, a fore axle 606, a motor reducer mounting plate 607, a cylindrical filter screen 608, a compressed disc 609, a spring 610, a scraping plate 611, a baffle ring 612, a helical cylinder upper portion 613, an end cover 614, a filling gate valve conveying component 615, and an upper filter screen, further, the helical extrusion dewatering component 6 is mounted on an upper portion of the processor body 1 through the helical extrusion fore plate 605 and rear plate so as to form a cylinder, the end cover 614 is mounted on a rearmost end of the cylinder, the helical cylinder lower portion 603 and the helical cylinder upper portion 613 are welded to the helical extrusion fore plate 605 and rear plate respectively, two bearing seats 604 are mounted on fore end and rear end of a central axial of the cylinder respectively, the fore axle 606 is mounted on the bearing seat 604 on the fore end, the fore axle 606 inserts into an end axle portion of the helical transmission element 601, the bearing seat 604 on the fore end and the motor reducer mounting plate 607 are mounted on the helical extrusion fore plate 605, the motor reducer 602 is mounted on the motor reducer mounting plate 607, the cylindrical filter screen 608 is mounted on the helical transmission element 601 and surrounds the helical transmission element 601; the compressed disc 609, the spring 610, and the scraping plate 611 are mounted on a middle portion of a rear end of the cylindrical filter screen 608, when a slag material is compressed, the compressed disc 609 would open, the scraping plate 611 and the baffle ring 612 are mounted on a rear end of the compressed disc 609, the filling gate valve conveying component 615 is mounted at a rearmost end of the cylinder to fill solid kitchen garbage into the plastic bag.

Figure 9:
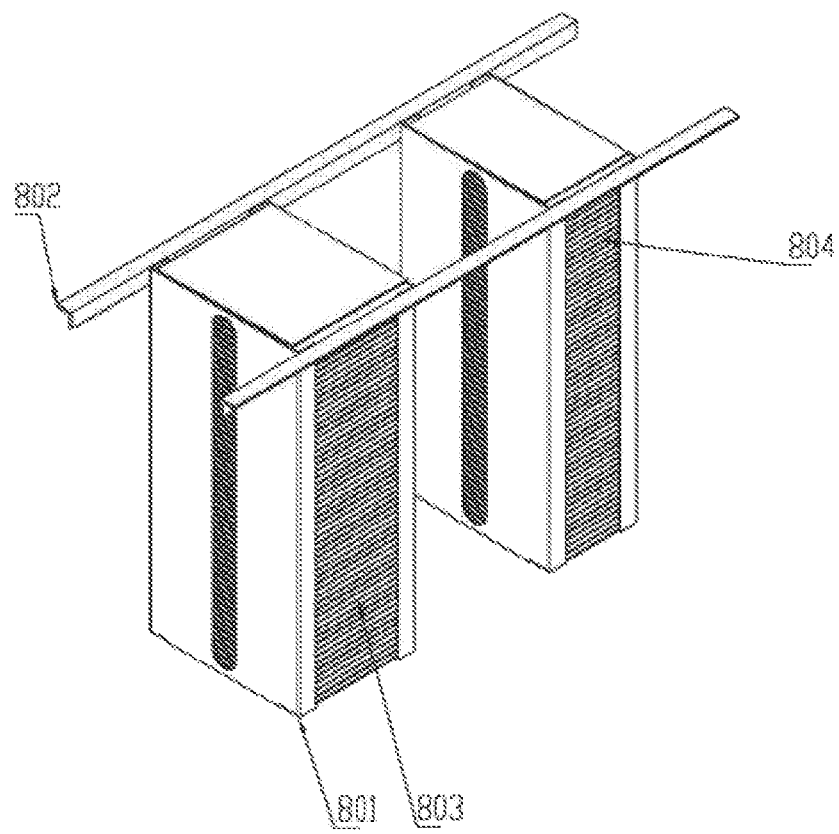
FIG. 9 is a schematic structural view of a plastic bag feeding component of a kitchen garbage processor according to one embodiment of the present disclosure.

Please refer to FIG. 9, which shows a schematic structural view of a plastic bag feeding component 8, the plastic bag feeding component 8 includes a bag box side plate 801, angle steel 802, a first plastic bag 803, and a second plastic bag 804. Further, two angle steels 802 are mounted on an upper portion of the processor body 1, two groups of bag box side plate 801 are symmetrically mounted between the two angle steels 802 so as to form a first plastic bag box having a volume of 25 L and a second plastic bag box having a volume of 10 L, the first plastic bag box having a volume of 25 L aligns to the rotating bracket 407 of the first packaging component 4 to package solid kitchen garbage, and the second plastic bag box having a volume of 10 L aligns to the rotating bracket 507 of the second packaging component 5 to package liquid oil.

Garbage cans commonly used are mostly made of metal or plastic, a plastic bag is placed in the garbage can, and the plastic bag may be tied and thrown away when it is filled with garbage, and most garbage cans have a lid to keep peculiar smell of garbage from scattering, kitchen garbage generally refers to garbage produced after cooking, cooked kitchen garbage includes waste food, leftovers, vegetable leaves, different kinds of bones, etc.; and raw kitchen garbage includes fruit peel, eggshell, tea leaves, bone, scallop, etc.; it refers to source raw material and finished product (cooked food) or leftover needed in family diet, commonly used kitchen waste equipment on garbage collection don't have a function of crushing waste and separating oil and water, and don't have a function of packaging processed kitchen garbage, therefore, it is inconvenient to dump garbage, and what's more, waste water flowed out of the garbage would pollute environment and influence garbage collection.

Various kinds of kitchen garbage processing equipment on the market mainly process garbage by grinding kitchen garbage into fine particles and then discharging them into buckets or garbage bags, therefore, germs and mosquitoes may be bred, and peculiar smell may generate due to storage of food garbage, and sewer may be easily blocked. Oil and water are separated from kitchen garbage and packaged respectively by the kitchen garbage processor provided in embodiments of the present disclosure, which effectively solve the source of various peculiar smell and infectious diseases, and problem of easy blockage of sewer, therefore home environment and urban environment are effectively optimized.

Solid garbage, oil and water in kitchen garbage can be automatically separated and automatically packaged respectively by the kitchen garbage processor provided in embodiments of the present disclosure, so as to improve garbage processing efficiency and provide a more scientific waste process plan. The kitchen garbage processor provided in embodiments of the present disclosure may have functions of crushing and extruding kitchen garbage and separating oil and water, and the water-squeezed kitchen garbage and oil are packaged respectively, which solves problems that commonly used kitchen waste equipment on garbage collection don't have a function of crushing waste, it is inconvenient to dump garbage, and waste water flowed out of the garbage would pollute environment and influence garbage collection.

It should be noted that, for one with ordinary skill in the art, one or more technical features mentioned in the above-mentioned embodiments could be combined depend on actual needs, so as to produce new embodiments; these new embodiments may have technical effects that correspond to the one or more technical features.

Only relevant structures that relates to realize the main purpose of the present disclosure are mainly described in detail in embodiments of the present disclosure, specific location, relative relationship, and optional other implementations of each functional structure, and other function structure that can be used in kitchen garbage processor should be covered in embodiments of the present disclosure, as long as one with ordinary skills in the art could obtain without any creative labor The above content is only a further detailed description of the present disclosure in combination with specific embodiments; it should not be construed that specific implements of the present disclosure will be limited to those descriptions. For those skilled in the art, simple deducing or replacements may be done, without departure from the idea of the present disclosure.

The invention claimed is:

1. A kitchen garbage disposer, comprising:
a body having a working platform disposed thereon, wherein an inlet for dumping kitchen garbage is disposed on the working platform, and at least one layer of filter screen is disposed at the inlet in order to filter out part of the kitchen garbage not suitable to be disposed;
a dewatering component disposed in the body, wherein a fore-end of the dewatering component is communicated with the inlet and configured to send the kitchen garbage that to be disposed to the dewatering component to separate a solid garbage from a liquid garbage; a solid garbage outlet configured for sending out the solid garbage and a liquid garbage outlet configured for sending out the liquid garbage are disposed at a rear end of the dewatering component; and an oil-water separating component disposed in the body and located at downstream of the dewatering component, wherein a fore-end of the oil-water separating component is communicated with the liquid garbage outlet so as to send the liquid garbage that to be disposed to the oil-water separating component to separate oil from water; an oil outlet configured for sending out separated oil and a water outlet configured for sending out separated water are disposed at a rear end of the oil-water separating component.

2. The kitchen garbage disposer of claim 1, further comprising a first packaging component and a packaging bag feeding component, the first packaging component and the packaging bag feeding component are disposed in the body and located at downstream of the dewatering component; the first packaging component is disposed at the solid garbage outlet and configured to pickup a packaging bag from the packaging bag feeding component and send a solid garbage that sent out from the solid garbage outlet to the picked packaging bag.

3. The kitchen garbage disposer of claim 2, wherein the first packaging component comprises a first side sucker device, a second side sucker device and a rotating bracket; the first side sucker device is disposed opposite to the second side sucker device, whereby a space formed between the first side sucker device and the second side sucker device is configured to accommodate a packaging bag for holding the solid garbage, such that the packaging bag is opened by suction force generated by the first side sucker device and the second side sucker device; the rotating bracket is connected to the first side sucker device so as to drive the first side sucker device to rotate at a position opposite to the second side sucker device and a position opposite to the packaging bag feeding component, and when the first side sucker device is at the position opposite to the packaging bag feeding component, the first side sucker device is configured to pick up a packaging bag from the packaging bag feeding component.

4. The kitchen garbage disposer of claim 3, wherein the first packaging component further comprises a vacuum pump assembly, a sealing device and a push plate assembly; the vacuum pump assembly and the sealing device are disposed at a position of a bag mouth of the packaging bag, the vacuum pump assembly is configured to vacuum the packaging bag after the packaging bag is filled with the solid garbage, and the sealing device is configured to seal the packaging bag after the packaging bag is filled with the solid garbage; the push plate assembly is configured to push the packaging bag out of the body after the packaging bag is sealed.

5. The kitchen garbage disposer of claim 4, wherein a sliding door assembly is disposed on a side of the body that bagged kitchen garbage is taken out therefrom, a door of the sliding door assembly is opened when the push plate assembly push the packaging bag that filed with kitchen garbage out of the body, and the door of the sliding door assembly is automatically closed when the packaging bag is taken away.

6. The kitchen garbage disposer of claim 1, further comprising a second packaging component and a packaging bag feeding component, the second packaging component and the packaging bag feeding component are disposed in the body and located at downstream of the oil-water separating component; the second packaging component is disposed at the oil outlet and configured to pickup a packaging bag from the packaging bag feeding component and send oil that sent out from the oil outlet to the picked packaging bag.

7. The kitchen garbage disposer of claim 6, wherein the second packaging component comprises a first side sucker device, a second side sucker device, a rotating bracket, a vacuum pump assembly, a sealing device and a push plate assembly; the first side sucker device is disposed opposite to the second side sucker device, whereby a space formed between the first side sucker device and the second side sucker device is configured to accommodate a packaging bag for holding solid garbage, such that the packaging bag is opened by suction force generated by the first side sucker device and the second side sucker device; the rotating bracket is connected to the first side sucker device so as to drive the first side sucker device to rotate at a position opposite to the second side sucker device and a position opposite to the packaging bag feeding component, and when the first side sucker device is at the position opposite to the packaging bag feeding component, the first side sucker device is configured to pick up packaging bag from the packaging bag feeding component; the vacuum pump assembly and the sealing device is disposed at a position of a bag mouth of the packaging bag, the vacuum pump assembly is configured to vacuum the packaging bag after the packaging bag is filled with the solid garbage, and the sealing device is configured to seal the packaging bag after the packaging bag is filled with the solid garbage; the push plate assembly is configured to push the packaging bag out of the body after the packaging bag is sealed; a sliding door assembly is disposed on a side of the body that bagged kitchen garbage is taken out therefrom, a door of the sliding door assembly is opened when the push plate assembly push the packaging bag that filed with kitchen garbage out of the body, and the door of the sliding door assembly is automatically closed when the packaging bag is taken away.

8. The kitchen garbage disposer of claim 1, wherein the dewatering component comprises a helical transmission element, a helical cylinder and cylindrical filter screen, the helical cylinder is disposed on the helical transmission element, the cylindrical filter screen is disposed on the helical cylinder, wherein the kitchen garbage is dumped into the helical cylinder through the inlet of the body, and along with rotating of the helical transmission element, the solid garbage is sent to the solid garbage outlet and the liquid garbage is sent to the liquid garbage outlet through the cylindrical filter screen.

9. The kitchen garbage disposer of claim 1, wherein the oil-water separating component comprises an oil-water mixing chamber, an oil-water separating chamber and an oil storage chamber; an inlet of the oil-water mixing chamber is communicated with the liquid garbage outlet of the dewatering component, the oil-water mixing chamber is communicated with the oil-water separating chamber, and a filter screen is disposed between the oil-water mixing chamber and the oil-water separating chamber; the oil storage chamber is communicated with an upper portion of the oil-water separating chamber so as to send the separated oil to the storage chamber, the water outlet is communicated with an bottom portion of the oil-water separating chamber so as to send out the separated water; the oil storage chamber is communicated with the oil outlet so as to send out the separated oil.

10. The kitchen garbage disposer of claim 1, further comprising:
 a hot water spraying cleaner and/or a deodorizing and disinfecting device, the spraying cleaner comprises an electrical water heater, a water pump, a water supplying assembly and a spraying pipe; the water supplying assembly is communicated with a water supplying inlet, and an outlet is communicated with a water outlet of the electrical water heater; the water outlet of the electrical water heater is communicated with a water inlet of the water pump, a water outlet of the water pump is communicated with the spraying pipe so as to transfer hot water to a spraying mouth; or
 a hot water spraying cleaner and a deodorizing and disinfecting device, the spraying cleaner comprises a electrical water heater, a water pump, a water supplying assembly and a spraying pipe; the water supplying assembly is communicated with a water supplying inlet, and an outlet is communicated with a water outlet of the electrical water heater; the water outlet of the electrical water heater is communicated with a water inlet of the water pump, a water outlet of the water pump is communicated with the spraying pipe so as to transfer hot water to a spraying mouth; and the deodorizing and disinfecting device is communicated with the spraying pipe of the hot water spraying cleaner so as to inject a deodorizing and disinfecting liquid stored in the deodorizing and disinfecting device into the spraying pipe.

* * * * *